US009538544B2

(12) United States Patent
Lin et al.

(10) Patent No.: US 9,538,544 B2
(45) Date of Patent: Jan. 3, 2017

(54) ANNOUNCING A COMMUNICATION SESSION WITHIN A WIRELESS COMMUNICATIONS SYSTEM

(71) Applicant: QUALCOMM Incorporated, San Diego, CA (US)

(72) Inventors: Yih-Hao Lin, San Diego, CA (US); Bongyong Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 356 days.

(21) Appl. No.: 14/280,482

(22) Filed: May 16, 2014

(65) Prior Publication Data
US 2014/0254413 A1 Sep. 11, 2014

Related U.S. Application Data

(62) Division of application No. 12/782,590, filed on May 18, 2010, now Pat. No. 8,797,949.
(Continued)

(51) Int. Cl.
*H04W 72/08* (2009.01)
*H04W 76/02* (2009.01)
(Continued)

(52) U.S. Cl.
CPC ........... *H04W 72/085* (2013.01); *H04W 24/08* (2013.01); *H04W 76/02* (2013.01);
(Continued)

(58) Field of Classification Search
None
See application file for complete search history.

(56) References Cited

U.S. PATENT DOCUMENTS 7,853,258 B2  12/2010  Xu et al.
8,126,021 B2  2/2012  Wang et al.
(Continued)

FOREIGN PATENT DOCUMENTS

CN    1551675      12/2004
CN    1918926 A    2/2007
(Continued)

OTHER PUBLICATIONS

Ericsson: "Fast transition from power saving state to active" 3GPP Draft; R2-062116, 3rd Generation Partnership Project (3GPP), Mobile Competence Centre ; 650, Route Des Lucioles ; F-06921 Sophia-Antipolis Cedex ; France, vol. RAN WG2, No. Tallinn; Aug. 2006.
(Continued)

*Primary Examiner* — Anh Ngoc Nguyen
(74) *Attorney, Agent, or Firm* — Jia J. Wu

(57) ABSTRACT

An access network (AN) receives a call announcement message for transmission to an access terminal (AT). The AN initiates, in response to the received call announcement message, a physical-layer synchronization procedure for at least one channel between the AN and the AT, the physical-layer synchronization procedure associated with a transition of the access terminal to a dedicated channel state. The AN performs the initiation by sending a message to the AT. In response to the message, the AT monitors a downlink channel for receipt of the call announcement message. The AN then transmits the call announcement message on the downlink channel to the access terminal, and the AT receives the call announcement message due to the monitoring. The call announcement message is transmitted either (i) before the physical layer synchronization procedure completes or (ii) before a transmission of a reconfiguration complete
(Continued)

message indicating completion of dedicated channel state transition.

30 Claims, 11 Drawing Sheets

Related U.S. Application Data

(60) Provisional application No. 61/180,645, filed on May 22, 2009.

(51) Int. Cl.
*H04W 24/08* (2009.01)
*H04W 48/08* (2009.01)
*H04W 68/00* (2009.01)
*H04W 76/04* (2009.01)

(52) U.S. Cl.
CPC ............ *H04W 48/08* (2013.01); *H04W 68/00* (2013.01); *H04W 76/046* (2013.01)

(56) References Cited

U.S. PATENT DOCUMENTS

| | | | |
|---|---|---|---|
| 8,797,949 | B2 | 8/2014 | Lin et al. |
| 2005/0141471 | A1 | 6/2005 | Virtanen et al. |
| 2005/0176437 | A1* | 8/2005 | Mir ................. H04W 56/00 455/450 |
| 2005/0250504 | A1* | 11/2005 | Mikola ............. H04W 8/183 455/450 |
| 2007/0123195 | A1 | 5/2007 | Lv et al. |
| 2008/0008212 | A1 | 1/2008 | Wang et al. |
| 2008/0123585 | A1 | 5/2008 | Granzow et al. |
| 2008/0132239 | A1 | 6/2008 | Khetawat et al. |
| 2009/0052432 | A1* | 2/2009 | Jung .................... H04W 76/02 370/350 |
| 2009/0181710 | A1 | 7/2009 | Pani et al. |
| 2011/0085514 | A1 | 4/2011 | Higuchi et al. |
| 2011/0134836 | A1 | 6/2011 | Lin et al. |

FOREIGN PATENT DOCUMENTS

| | | |
|---|---|---|
| CN | 101080102 A | 11/2007 |
| CN | 100455134 C | 1/2009 |
| CN | 100459808 C | 2/2009 |
| CN | 101379743 A | 3/2009 |
| EP | 2018072 A1 | 1/2009 |
| JP | 2010502048 A | 1/2010 |
| WO | WO-2008020804 A2 | 2/2008 |
| WO | WO-2008028318 A1 | 3/2008 |

OTHER PUBLICATIONS

European Search Report—EP12173617—Search Authority—Munich—Nov. 9, 2012.
International Preliminary Report on Patentability—PCT/US2010/035482, The International Bureau of WIPO—Geneva, Switzerland, Jul. 12, 2011.
International Search Report and Written Opinion—PCT/US2010/035482, International Search Authority—European Patent Office—Sep. 21, 2010.
Siemens: "Considerations on Fast DCH Setup Issue Related to the Physical Random", 3GPP TSG RAN WG1 Meeting 32—R1-030531, May 19, 2003 (May 19, 2003), pp. 1-4, XP002311081 Section 2.2.

* cited by examiner

ANNOUNCING A COMMUNICATION SESSION WITHIN A WIRELESS COMMUNICATIONS SYSTEM

CROSS REFERENCE TO RELATED APPLICATIONS

The present application for patent is a Divisional of Non-Provisional application Ser. No. 12/782,590, entitled "ANNOUNCING A COMMUNICATION SESSION WITHIN A WIRELESS COMMUNICATIONS SYSTEM", filed May 18, 2010, which in turn claims priority to Provisional Application No. 61/180,645, entitled "ANNOUNCING A COMMUNICATION SESSION WITHIN A WIRELESS COMMUNICATIONS SYSTEM", filed May 22, 2009, each of which is assigned to the assignee hereof and each of which is hereby expressly incorporated by reference herein in its entirety.

BACKGROUND OF THE INVENTION

1. Field of the Invention

Embodiments of the invention relates to announcing a communication session within a wireless communications system.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (W-CDMA), CDMA2000 (such as CDMA2000 1xEV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Conventionally, data packets within a wireless communication network have been configured to be sent to a single destination or access terminal A transmission of data to a single destination is referred to as "unicast". As mobile communications have increased, the ability to transmit given data concurrently to multiple access terminals has become more important. Accordingly, protocols have been adopted to support concurrent data transmissions of the same packet or message to multiple destinations or target access terminals. A "broadcast" refers to a transmission of data packets to all destinations or access terminals (e.g., within a given cell, served by a given service provider, etc.), while a "multicast" refers to a transmission of data packets to a given group of destinations or access terminals. In an example, the given group of destinations or "multicast group" may include more than one and less than all of possible destinations or access terminals (e.g., within a given group, served by a given service provider, etc.). However, it is at least possible in certain situations that the multicast group comprises only one access terminal, similar to a unicast, or alternatively that the multicast group comprises all access terminals (e.g., within a given cell, etc.), similar to a broadcast.

Broadcasts and/or multicasts may be performed within wireless communication systems in a number of ways, such as performing a plurality of sequential unicast operations to accommodate the multicast group, allocating a unique broadcast/multicast channel (BCH) for handling multiple data transmissions at the same time and the like. A conventional system using a broadcast channel for push-to-talk communications is described in United States Patent Application Publication No. 2007/0049314 dated Mar. 1, 2007 and entitled "Push-To-Talk Group Call System Using CDMA 1x-EVDO Cellular Network", the contents of which are incorporated herein by reference in its entirety. As described in Publication No. 2007/0049314, a broadcast channel can be used for push-to-talk calls using conventional signaling techniques. Although the use of a broadcast channel may improve bandwidth requirements over conventional unicast techniques, the conventional signaling of the broadcast channel can still result in additional overhead and/or delay and may degrade system performance.

The $3^{rd}$ Generation Partnership Project 2 ("3GPP2") defines a broadcast-multicast service (BCMCS) specification for supporting multicast communications in CDMA2000 networks. Accordingly, a version of 3GPP2's BCMCS specification, entitled "CDMA2000 High Rate Broadcast-Multicast Packet Data Air Interface Specification", dated Feb. 14, 2006, Version 1.0 C.S0054-A, is hereby incorporated by reference in its entirety.

SUMMARY

An access network (AN) receives a call announcement message for transmission to an access terminal (AT). The AN initiates, in response to the received call announcement message, a physical-layer synchronization procedure for at least one channel between the AN and the AT, the physical-layer synchronization procedure associated with a transition of the access terminal to a dedicated channel state. The AN performs the initiation by sending a message to the AT. In response to the message, the AT monitors a downlink channel for receipt of the call announcement message. The AN then transmits the call announcement message on the downlink channel to the access terminal, and the AT receives the call announcement message due to the monitoring. The call announcement message is transmitted either (i) before the physical layer synchronization procedure completes or (ii) before a transmission of a reconfiguration complete message indicating completion of dedicated channel state transition.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
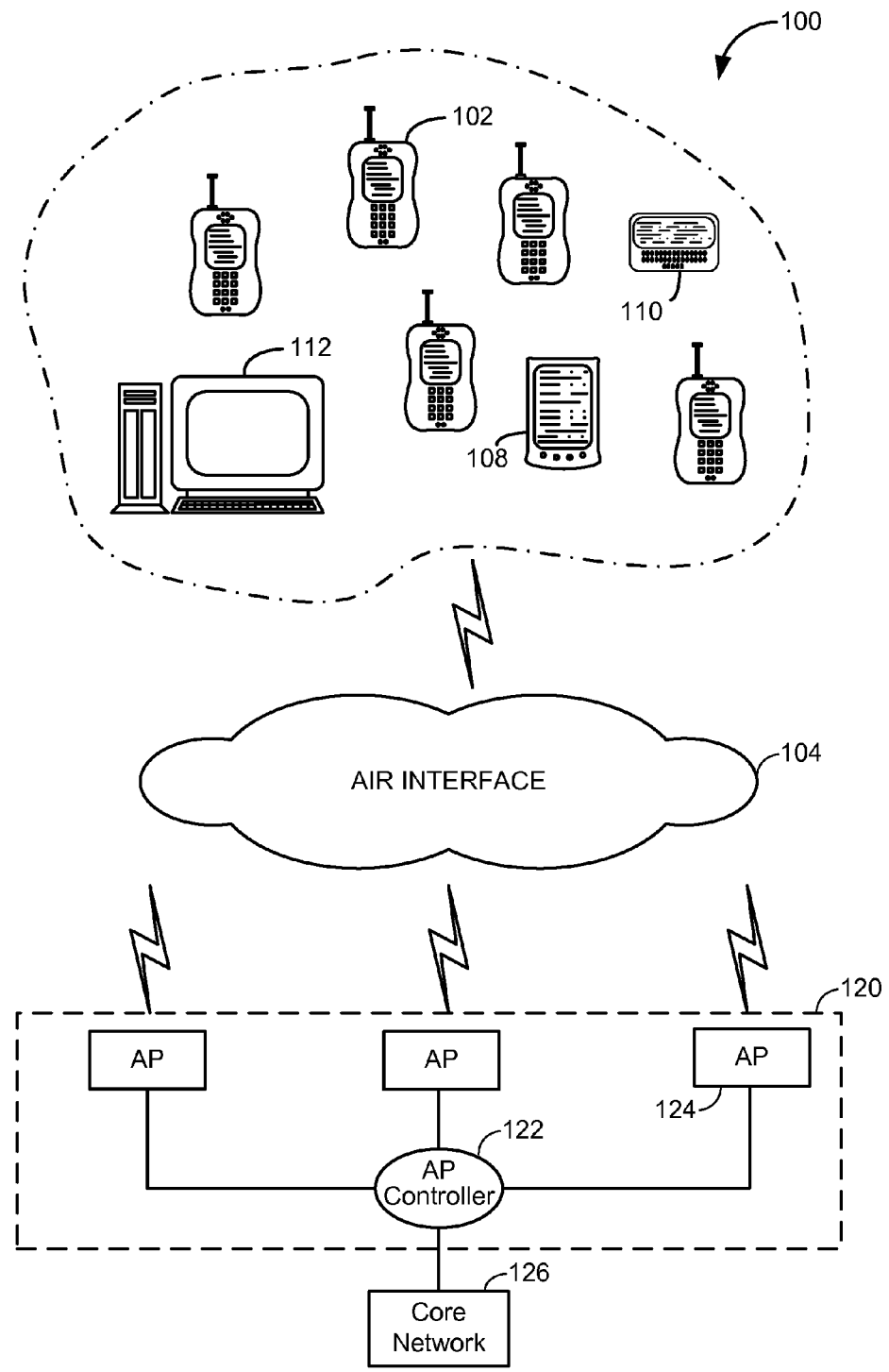
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT) or user equipment (UE), may be mobile or stationary, and may communicate with one or more access points (APs). For example, APs may correspond to HDR base stations, and may be referred to herein as modem pool transceivers (MPTs) or base stations (BS), Node Bs and other equivalent terms. An access terminal or UE transmits and receives data packets through one or more of the APs to an AP controller. For example, the AP controller may correspond to an HDR base station controller, and may be referred to as a modem pool controller (MPC), base station controller (BSC), Mobile Switching Center (MSC), a radio network control (RNC) and other equivalent terms. The APs and AP controllers are parts of a network called a radio access network (RAN). A radio access network can transport voice and data packets between multiple access terminals.

The radio access network may be further connected to additional networks outside the radio access network, such core network including specific carrier related servers and devices and connectivity to other networks such as a corporate intranet, the Internet, public switched telephone network (PSTN) and may transport voice and data packets between each access terminal and such networks. An access terminal that has established an active traffic channel connection with one or more APs may be referred to as an active access terminal, and can be referred to as being in a traffic state. An access terminal that is in the process of establishing an active traffic channel (TCH) connection with one or more APs can be referred to as being in a connection setup state. An access terminal may be any data device that communicates through a wireless channel or through a wired channel. An access terminal may further be any of a number of types of devices including but not limited to PC card, compact flash device, external or internal modem, or wireless or wireline phone. The communication link through which the access terminal sends signals to the AP(s) is called an uplink channel (e.g., a reverse traffic channel, a control channel, an access channel, etc.). The communication link through which APs send signals to an access terminal is called a downlink channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a block diagram of one exemplary embodiment of a wireless communications system 100 in accordance with at least one embodiment of the invention. System 100 can contain access terminals or UEs, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or core network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "AT", user equipment, "UE", "wireless device", "client device", "mobile terminal", "mobile station" and variations thereof may be used interchangeably.

Referring back to FIG. 1, the components of the wireless communications system 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, core network 126, the Internet, PSTN and/or other remote servers.

The RAN 120 controls messages (typically sent as data packets) sent to an AP controller 122 (e.g., a base station controller/packet control function (BSC/PCF) in EV-DO, a RNC in W-CDMA, etc.). The AP controller 122 is responsible for signaling, establishing, and tearing down bearer channels (i.e., data channels) between a packet service node (e.g., a Packet Data Service Node (PDSN) in 1x EV-DO, a Serving General Packet Radio Services (GPRS) Support Node (SGSN) in W-CDMA, etc.) and the access terminals 102/108/110/112. If link layer encryption is enabled, the AP controller 122 also encrypts the content before forwarding it over the air interface 104. The function of the AP controller 122 is well-known in the art and will not be discussed further for the sake of brevity. The core network 126 may communicate with the AP controller 122 by a network, the Internet and/or a public switched telephone network (PSTN). Alternatively, the BSC/PCF 122 may connect directly to the Internet or external network. Typically, the network or Internet connection between the core network 126 and the AP controller 122 transfers data, and the PSTN transfers voice information. The AP controller 122 can be connected to multiple APs 124. In a similar manner to the core network 126, the AP controller 122 is typically connected to the APs 124 by a network, the Internet and/or PSTN for data transfer and/or voice information. The APs 124 can broadcast data messages wirelessly to the access terminals, such as cellular telephone 102. The APs 124, AP controller 122 and other components may form the RAN 120, as is known in the art. However, alternate configurations may also be used and the invention is not limited to the configuration illustrated. For example, in another embodiment the functionality of the AP controller 122 and one or more of the APs 124 may be collapsed into a single "hybrid" module having the functionality of both the AP controller 122 and the APs 124.

Figure 2A:
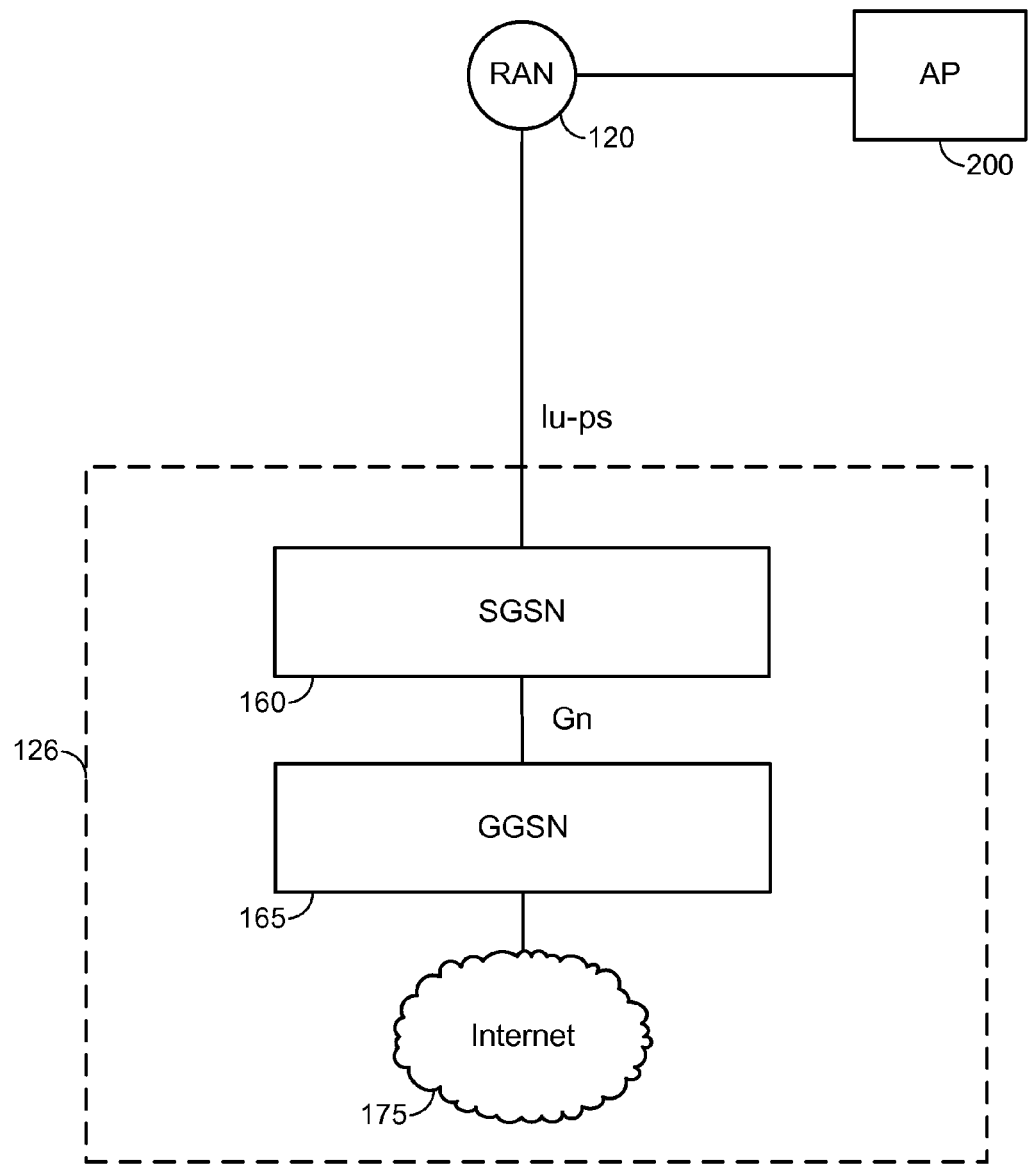
FIG. 2A illustrates the core network of FIG. 1 according to an embodiment of the present invention.

FIG. 2A illustrates the core network 126 according to an embodiment of the present invention. In particular, FIG. 2A illustrates components of a General Packet Radio Services (GPRS) core network implemented within a W-CDMA system. In the embodiment of FIG. 2A, the core network 126 includes a Serving GPRS Support Node (SGSN) 160, a Gateway GPRS Support Node (GGSN) 165 and an Internet 175. However, it is appreciated that portions of the Internet 175 and/or other components may be located outside the core network in alternative embodiments.

Generally, GPRS is a protocol used by Global System for Mobile communications (GSM) phones for transmitting Internet Protocol (IP) packets. The GPRS Core Network (e.g., the GGSN 165 and one or more SGSNs 160) is the centralized part of the GPRS system and also provides support for W-CDMA based 3G networks. The GPRS core network is an integrated part of the GSM core network, provides mobility management, session management and transport for IP packet services in GSM and W-CDMA networks.

The GPRS Tunneling Protocol (GTP) is the defining IP protocol of the GPRS core network. The GTP is the protocol which allows end users (e.g., access terminals) of a GSM or W-CDMA network to move from place to place while continuing to connect to the internet as if from one location at the GGSN 165. This is achieved transferring the subscriber's data from the subscriber's current SSGN 160 to the GGSN 165, which is handling the subscriber's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reach-ability, updates or modifications such as when a subscriber moves from one SGSN to another, etc.). GTP' is used for transfer of charging data from GSNs to a charging function.

Referring to FIG. 2A, the GGSN 165 acts as an interface between the GPRS backbone network (not shown) and the external packet data network 175. The GGSN 165 extracts the packet data with associated packet data protocol (PDP) format (e.g., IP or PPP) from the GPRS packets coming from the SGSN 160, and sends the packets out on a corresponding packet data network. In the other direction, the incoming data packets are directed by the GGSN 165 to the SGSN 160 which manages and controls the Radio Access Bearer (RAB) of the destination AT served by the RAN 120. Thereby, the GGSN 165 stores the current SGSN address of the target AT and his/her profile in its location register (e.g., within a PDP context). The GGSN is responsible for IP address assignment and is the default router for the connected AT. The GGSN also performs authentication and charging functions.

The SGSN 160 is representative of one of many SGSNs within the core network 126, in an example. Each SGSN is responsible for the delivery of data packets from and to the mobile stations or ATs within an associated geographical service area. The tasks of the SGSN 160 include packet routing and transfer, mobility management (e.g., attach/detach and location management), logical link management, and authentication and charging functions. The location register of the SGSN stores location information (e.g., current cell, current VLR) and user profiles (e.g., IMSI, PDP address(es) used in the packet data network) of all GPRS users registered with the SGSN 160, for example, within one or more PDP contexts for each user or AT. Thus, SGSNs are responsible for (i) de-tunneling downlink GTP packets from the GGSN 165, (ii) uplink tunnel IP packets toward the GGSN 165, (iii) carrying out mobility management as ATs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., UTRAN, in Universal Mobile Telecommunications System (UMTS) system architecture) communicates with the SGSN 160 via an Iu interface, with a transmission protocol such as Frame Relay or IP. The SGSN 160 communicates with the GGSN 165 via a Gn interface, which is an IP-based interface between SGSN 160 and other SGSNs (not shown) and internal GGSNs, and uses the GTP protocol defined above (e.g., GTP-U, GTP-C, GTP', etc.). While not shown in FIG. 2A, the Gn interface is also used by the Domain Name System (DNS). The GGSN 165 is connected to a Public Data Network (PDN) (not shown), and in turn to the Internet 175, via a Gi interface with IP protocols either directly or through a Wireless Application Protocol (WAP) gateway.

The PDP context is a data structure present on both the SGSN 160 and the GGSN 165 which contains a particular AT's communication session information when the AT has an active GPRS session. When an AT wishes to initiate a GPRS communication session, the AT must first attach to the SGSN 160 and then activate a PDP context with the GGSN 165. This allocates a PDP context data structure in the SGSN 160 that the subscriber is currently visiting and the GGSN 165 serving the AT's access point.

Figure 2B:
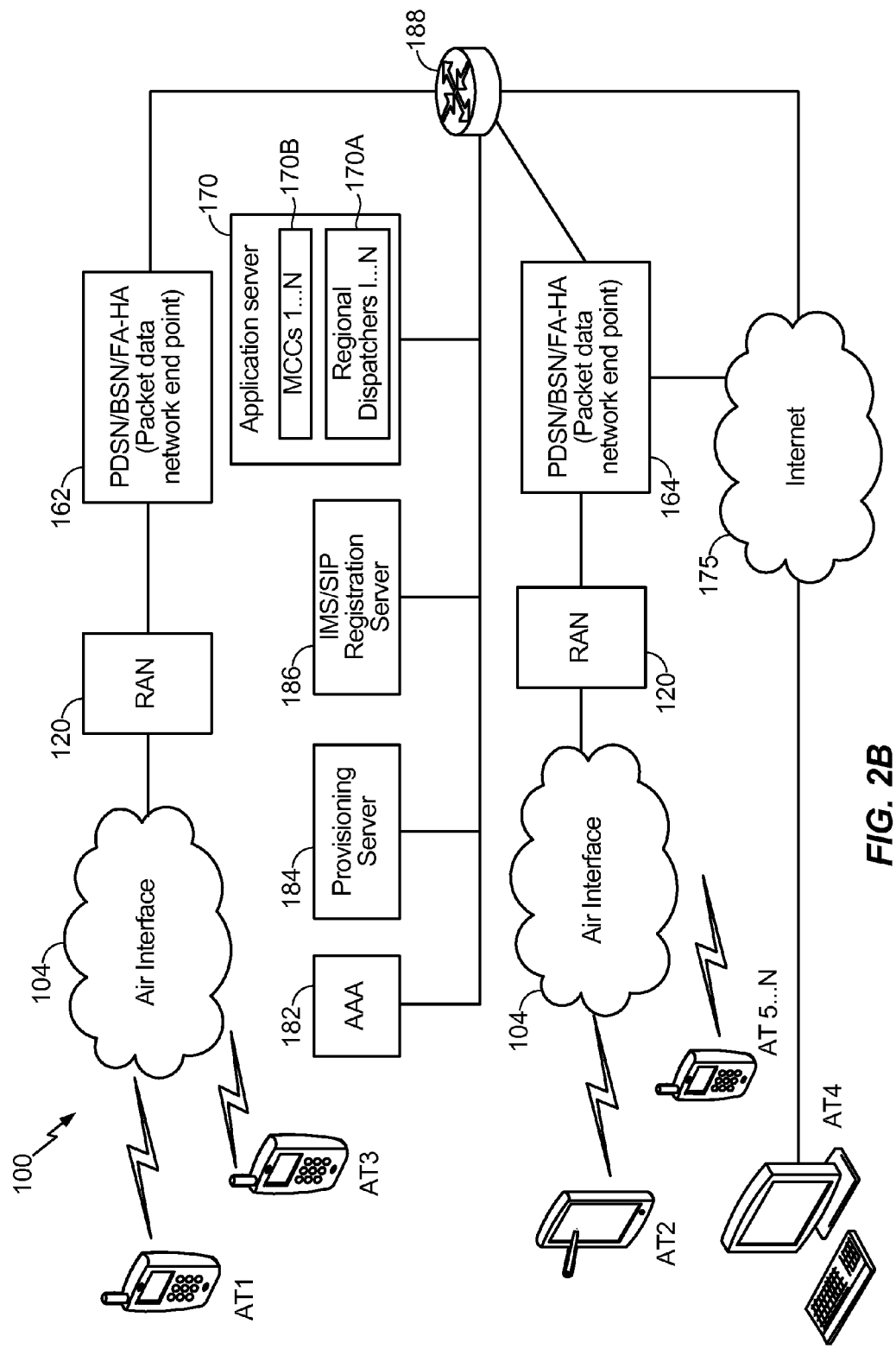
FIG. 2B illustrates an example of the wireless communications system 100 of FIG. 1 in more detail.

FIG. 2B illustrates an example of the wireless communications system 100 of FIG. 1 in more detail. In particular, referring to FIG. 2B, ATs 1 . . . N are shown as connecting to the RAN 120 at locations serviced by different packet data network end-points. The illustration of FIG. 2B is generic to both W-CDMA and 1x EV-DO systems. Accordingly, ATs 1 and 3 connect to the RAN 120 at a portion served by a first packet data network end-point 162 (e.g., which may correspond to PDSN, SGSN, GGSN BSN, a home agent (HA), a foreign agent (FA), etc.). The first packet data network end-point 162 in turn connects, via the routing unit 188, to the Internet 175 and/or to one or more of an authentication, authorization and accounting (AAA) server 182, a provisioning server 184, an Internet Protocol (IP) Multimedia Subsystem (IMS)/Session Initiation Protocol (SIP) Registration Server 186 and/or the application server 170. ATs 2 and 5 . . . N connect to the RAN 120 at a portion served by a second packet data network end-point 164 (e.g., which may correspond to PDSN, BSN, FA, HA, SGSN, GGSN, etc.). Similar to the first packet data network end-point 162, the second packet data network end-point 164 in turn connects, via the routing unit 188, to the Internet 175 and/or to one or more of the AAA server 182, a provisioning server 184, an IMS/SIP Registration Server 186 and/or the application server 170. AT 4 connects directly to the Internet 175, and through the Internet 175 can then connect to any of the system components described above.

Referring to FIG. 2B, ATs 1, 3 and 5 . . . N are illustrated as wireless cell-phones, AT 2 is illustrated as a wireless tablet-PC and AT 4 is illustrated as a wired desktop station. However, in other embodiments, it will be appreciated that the wireless communication system 100 can connect to any type of AT, and the examples illustrated in FIG. 2B are not intended to limit the types of ATs that may be implemented within the system. Also, while the AAA 182, the provisioning server 184, the IMS/SIP registration server 186 and the application server 170 are each illustrated as structurally separate servers, one or more of these servers may be consolidated in at least one embodiment of the invention.

Further, referring to FIG. 2B, the application server 170 is illustrated as including a plurality of media control complexes (MCCs) 1 . . . N 170B, and a plurality of regional dispatchers 1 . . . N 170A. Collectively, the regional dispatchers 170A and MCCs 170B are included within the application server 170, which in at least one embodiment can correspond to a distributed network of servers that collectively functions to arbitrate communication sessions (e.g., half-duplex group communication sessions via IP unicasting and/or IP multicasting protocols) within the wireless communication system 100. For example, because the communication sessions arbitrated by the application server 170 can theoretically take place between ATs located anywhere within the system 100, multiple regional dispatchers 170A and MCCs are distributed to reduce latency for the arbitrated communication sessions (e.g., so that a MCC in North America is not relaying media back-and-forth between session participants located in China). Thus, when reference is made to the application server 170, it will be appreciated that the associated functionality can be enforced by one or more of the regional dispatchers 170A and/or one or more of the MCCs 170B. The regional dispatchers 170A are generally responsible for any functionality related to establishing a communication session (e.g., handling signaling messages between the ATs, scheduling and/or sending announce messages, etc.), whereas the MCCs 170B are responsible for hosting the communication session for the duration of the call instance, including conducting an in-call signaling and an actual exchange of media during an arbitrated communication session.

Figure 3:
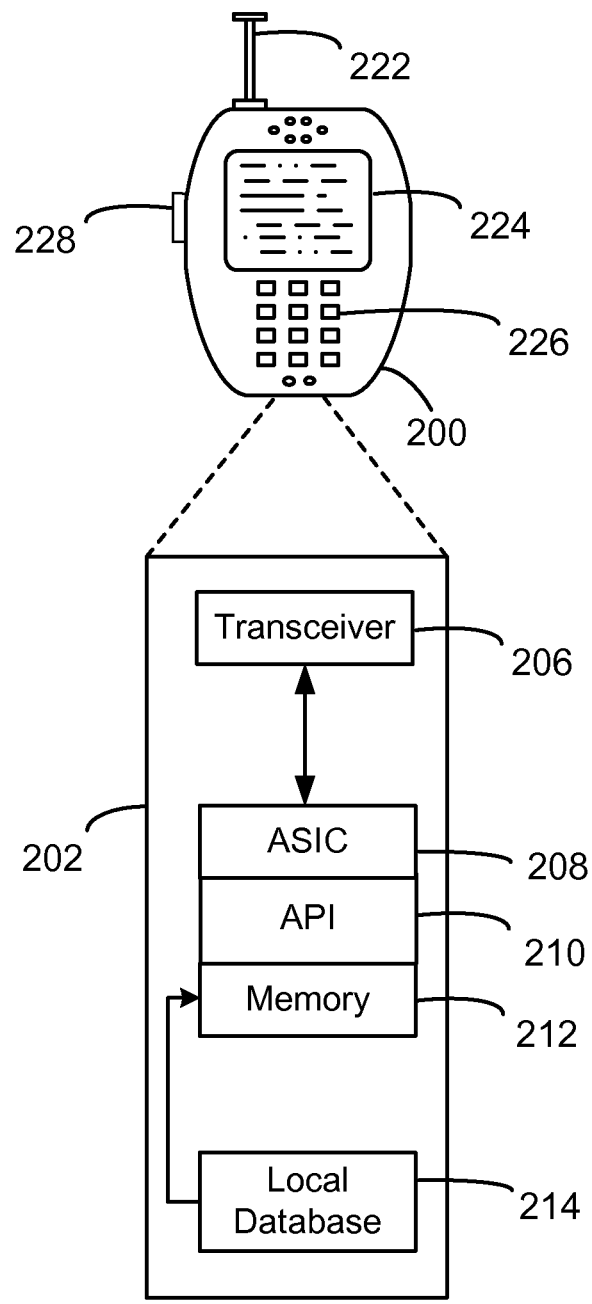
FIG. 3 is an illustration of an access terminal in accordance with at least one embodiment of the invention.

Referring to FIG. 3, an access terminal or UE 200, (here a wireless device), such as a cellular telephone, has a platform 202 that can receive and execute software applications, data and/or commands transmitted from the RAN 120 that may ultimately come from the core network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 3 are to be considered merely illustrative and the invention is not limited to the illustrated features or arrangement.

The wireless communication between the access terminal 102 and the RAN 120 can be based on different technologies, such as code division multiple access (CDMA), W-CDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. For example, in W-CDMA, the data communication is typically between the client device 102, AP(s) 124, and the AP controller 122 (e.g., RNC 122). The AP controller 122 or RNC 122 can be connected to multiple data networks such as the core network 126, PSTN, the Internet, a virtual private network, and the like, thus allowing the access terminal 102 access to a broader communication network. As discussed in the foregoing and known in the art, voice transmission and/or data can be transmitted to the access terminals from the RAN using a variety of networks and configurations. Accordingly, the illustrations provided herein are not intended to limit the embodiments of the invention and are merely to aid in the description of aspects of embodiments of the invention.

Below, embodiments of the invention are generally described in accordance with W-CDMA protocols and associated terminology (e.g., such as RNC, contrasted with BSC in EV-DO, or Node B, contrasted with BS or MPT/BS in EV-DO, etc.). However, it will be readily appreciated by one of ordinary skill in the art how the embodiments of the invention can be applied in conjunction with wireless communication protocols other than W-CDMA.

In a conventional server-arbitrated communication session (e.g., via half-duplex protocols, full-duplex protocols, VoIP, a group session over IP unicast, a group session over IP multicast, a push-to-talk (PTT) session, a push-to-transfer (PTX) session, etc.), a session or call originator sends a request to initiate a communication session to the application server 170, which then forwards a call announcement message to the RAN 120 for transmission to one or more targets of the call. As will be appreciated, for time-sensitive applications (e.g., PTT calls), it is important that the announce message be received by the one or more targets as quickly as possible.

Access terminals or User Equipments (UEs), in a Universal Mobile Telecommunications Service (UMTS) Terrestrial Radio Access Network (UTRAN) (e.g., the RAN 120) may be in either an idle mode or a connected mode. Below, reference is made to the RAN 120 and ATs, although it is appreciated that, when applied to UMTS, this terminology may be used to refer to the UTRAN and UEs, respectively.

Based on AT mobility and activity while in a radio resource control (RRC) connected mode, the RAN 120 may direct ATs to transition between a number of RRC sub-states; namely, CELL_PCH, URA_PCH, CELL_FACH, and CELL_DCH states, which may be characterized as follows:

In the CELL_DCH state, a dedicated physical channel is allocated to the AT in uplink and downlink, the AT is known on a cell level according to its current active set, and the AT has been assigned dedicated transport channels, downlink and uplink (TDD) shared transport channels, and a combination of these transport channels can be used by the AT.

In the CELL_FACH state, no dedicated physical channel is allocated to the AT, the AT continuously monitors a forward access channel (FACH), the AT is assigned a default common or shared transport channel in the uplink (e.g., a random access channel (RACH), which is a contention-based channel with a power ramp-up procedure to acquire the channel and to adjust transmit power) that the AT can transmit upon according to the access procedure for that transport channel, the position of the AT is known by RAN 120 on a cell level according to the cell where the AT last made a previous Cell Update, and, in TDD mode, one or several USCH or DSCH transport channels may have been established.

In the CELL_PCH state, no dedicated physical channel is allocated to the AT, the AT selects a PCH with the algorithm, and uses DRX for monitoring the selected PCH via an associated PICH, no uplink activity is possible and the position of the AT is known by the RAN 120 on cell level according to the cell where the AT last made a Cell Update in CELL_FACH state.

In the URA_PCH state, no dedicated channel is allocated to the AT, the AT selects a PCH with the algorithm, and uses DRX for monitoring the selected PCH via an associated PICH, no uplink activity is possible, and the location of the AT is known to the RAN 120 at a Registration area level according to the UTRAN registration area (URA) assigned to the AT during the last URA update in CELL_FACH state.

Accordingly, URA_PCH State (or CELL_PCH State) corresponds to a dormant state where the AT periodically wakes up to check a paging indicator channel (PICH) and, if needed, the associated downlink paging channel (PCH), and it may enter CELL_FACH state to send a Cell Update message for the following event: cell reselection, periodical Cell Update, uplink data transmission, paging response, re-entered service area. In CELL_FACH State, the AT may send messages on the random access channel (RACH), and may monitor a forward access channel (FACH). The FACH carries downlink communication from the RAN 120, and is mapped to a secondary common control physical channel (S-CCPCH). From CELL_FACH State, the AT may enter CELL_DCH state after a traffic channel (TCH) has been obtained based on messaging in CELL_FACH state.

Figure 4A:
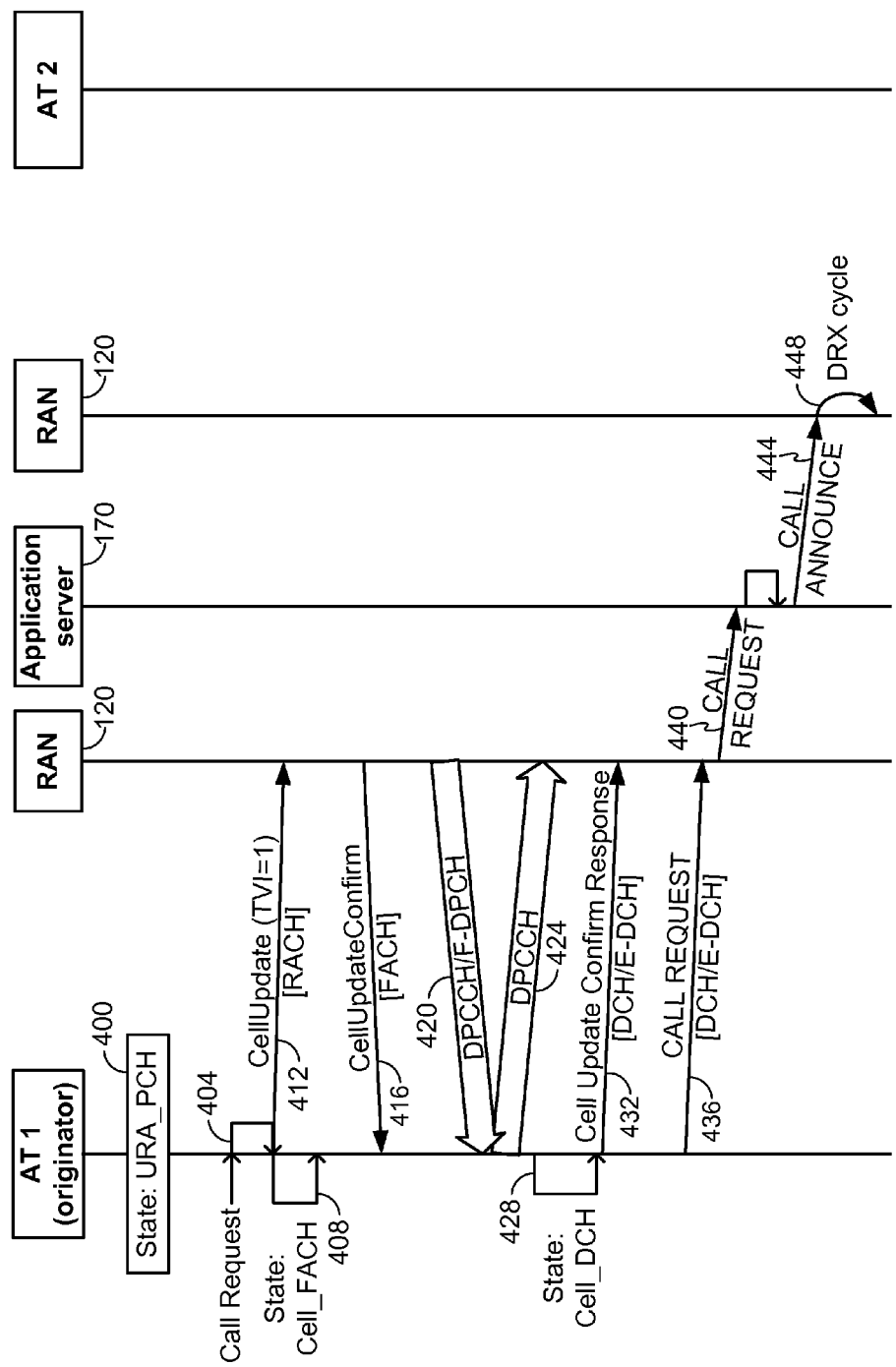
FIGS. 4A and 4B illustrate a process of setting up a server-arbitrated communication session in accordance with at least one embodiment of the invention.
Figure 4B:
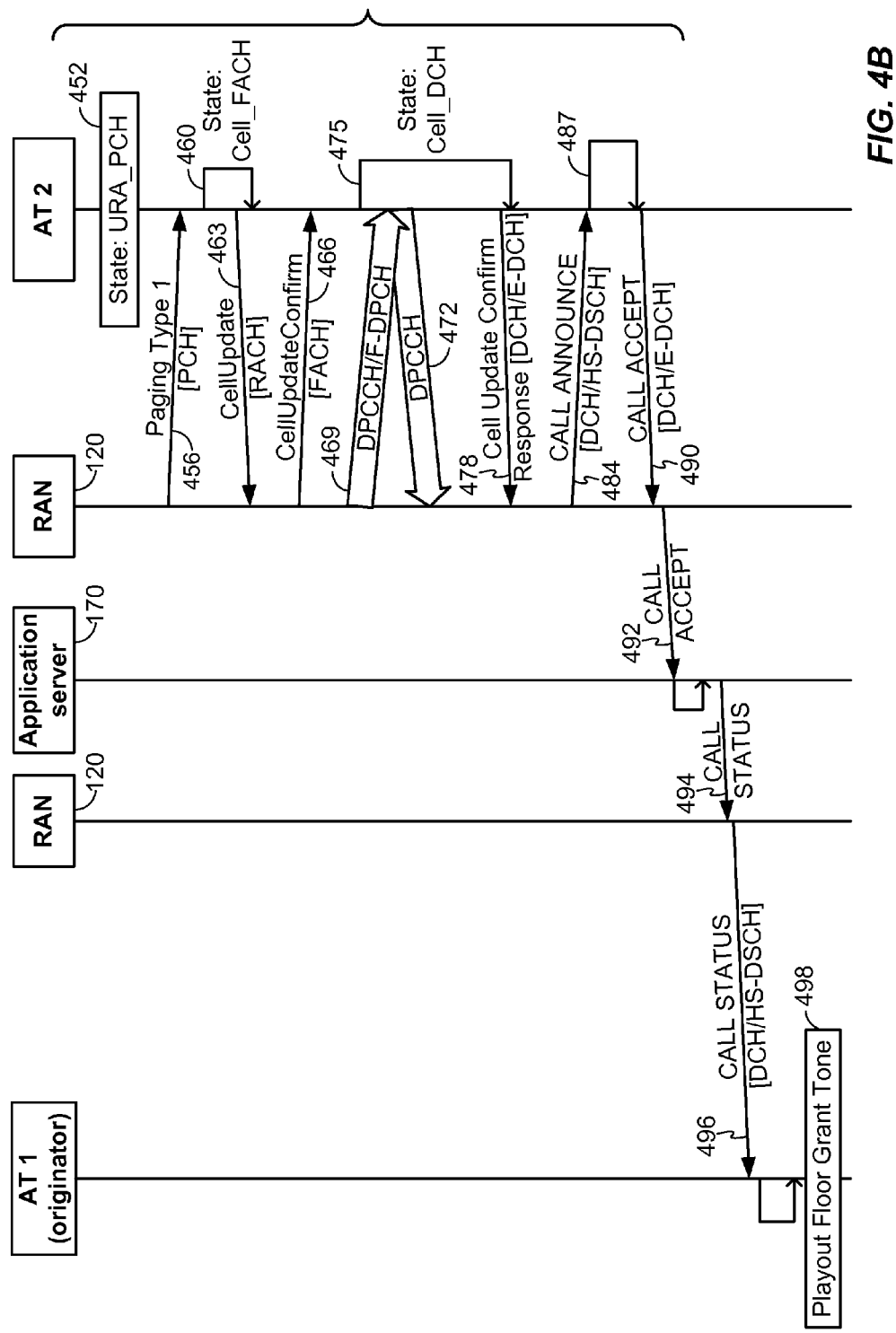

A process by which a server-arbitrated communication session can be set-up is described with respect to FIGS. 4A and 4B. In particular, FIGS. 4A and 4B illustrate a server-arbitrated session set-up process wherein the system 100 corresponds to a Universal Mobile Telecommunications System (UMTS) that uses Wideband Code Division Multiple Access (W-CDMA). However, it will be appreciated by one of ordinary skill in the art how FIGS. 4A and 4B can be modified to be directed to communication sessions in accordance with protocols other than W-CDMA.

Referring to FIG. 4A, a given AT ("AT 1") is in a URA_PCH state, 400. While AT 1 is in URA_PCH state, a user of AT 1 requests initiation of a communication session (e.g., a PTT session or other time-sensitive or delay-sensitive communication session), 404. Accordingly, AT 1 transitions to CELL_FACH state, 408, and AT 1 sends a Cell Update message on the RACH that includes AT 1's UTRAN Radio Network Temporary Identifier (RNTI) (U-RNTI), 412. The U-RNTI is well-known in the art, and corresponds to an identification assigned to an AT (e.g., during power-up, or upon transition to a new RNC serving area) that uniquely identifies an AT within a particular subnet, or set of sectors controlled by a single RNC of the RAN 120.

In 416, the RAN 120 configures and transmits a Cell Update Confirm message that assigns dedicated physical channels for DPCH, and may also assign dedicated physical channels for the E-DCH with an E-DCH radio network temporary identifier (E-RNTI) if the E-DCH is to be used by AT 1 for uplink data transmission.

Next, AT 1 and the RAN 120 engage in a L1 synchronization procedure. For example, the L1 synchronization procedure can occur on uplink and downlink dedicated physical control channels (DPCCH). The DPCCH is a physical channel on which signaling is transmitted both in the uplink direction by AT 1 and in the downlink direction by the RAN 120. Accordingly, during the L1 synchronization procedure, the RAN 120 sends signaling messages on the downlink DPCCH to AT 1, 420, and AT 1 sends signaling messages on the uplink DPCCH to the RAN 120, 424. Alternatively, the L1 synchronization procedure on downlink may be performed over a Fractional Dedicated Physical Channel (F-DPCH), which was introduced in 3GPP Release 6. The F-DPCH allows a Node B 124 of the RAN 120 to time-multiplex up to ten (10) users DPCCH signaling using a single Orthogonal Variable Spreading Factor (OVSF) code, and thereby improves the utilization of OVSF codes on the downlink. F-DPCH can be used when the HS-DSCH is configured and the DCH is not configured. Thus, when the F-DPCH is available, the UE or AT 200 will generally attempt to perform the L1 synchronization procedure over the F-DPCH.

When the L1 synchronization procedure is complete, AT 1 transitions to CELL_DCH state, 428, and transmits a Cell Update Confirm response message (e.g., a Radio Bearer Reconfiguration Complete message, a Transport Channel Reconfiguration Complete message and/or a Physical Channel Reconfiguration Complete message, based on whether the Radio Bearer, Transport Channel or Physical Channel is the higher layer to be reconfigured in the Cell Update Confirm message of 416) to the RAN 120 on the uplink DCH or E-DCH, 432. Because AT 1 now has access to the E-DCH, AT 1 also sends a call request message on the DCH or E-DCH to the RAN 120, 436, and the RAN 120 forwards the call request message to the application server 170, 440. The application server 170 processes the call request message, generates an announce message for announcing the communication session to a target AT 2 and forwards the announce message to the RAN 120, 444.

As will be appreciated by one of ordinary skill in the art, the RAN 120 cannot simply transmit the announce message to AT 2 immediately after receiving the call announce message from the application server 170. Rather, the RAN 120 waits for a next DRX cycle or paging cycle at which target AT 2 is expected to be monitoring for pages, 448. For convenience of explanation, it may be assumed that AT 2 is in URA_PCH state at this point, 452. While not shown in FIGS. 4A and 4B, if AT 2 already had an active traffic channel (TCH), the RAN 120 could simply send the announce message on the already-allocated TCH.

After the RAN 120 waits for the DRX cycle or paging cycle of AT 2, the RAN 120 transmits a type 1 page message to each of AT 2, 456. As will be appreciated by one of ordinary skill in the art, a type 1 page message corresponds to a page sent on a downlink paging channel (PCH), contrasted with a type 2 page message that corresponds to on a downlink DCH or FACH (which is not yet available because AT 2 are assumed to be in URA_PCH state). As will be appreciated by one of ordinary skill in the art, when the UE is in CELL_DCH or CELL_FACH state, the UTRAN RRC Layer of the RAN 120 would page the UE by transmitting a paging type 2 message on the DCH or FACH channel. As with paging type 1, the UE's RRC Layer notifies the upper layers of a core network (CN) domain and paging cause. Paging type 2 is used to deliver a second call while the UE is already active in another call (e.g., simultaneous voice and data).

Upon receiving the page message, AT 2 transitions to CELL_FACH state, 460, and AT 2 sends a Cell Update message on the RACH that includes the U-RNTI for AT 2, 463. In 466, the RAN 120 configures and transmits a Cell Update Confirm message that assigns a dedicated physical channel for DCH, and may also assign a dedicated physical channel for the E-DCH with an E-RNTI if the E-DCH is to be used by AT 2 for uplink data transmissions.

Upon receiving the Cell Update Confirm message in 466, AT 2 and the RAN 120 engage in a L1 synchronization procedure on the DPCCH or F-DPCH (e.g., as in 420 and 424). Accordingly, in an example, during the synchronization procedure, the RAN 120 sends signaling messages on the downlink DPCCH to AT 2, 469, and AT 1 sends signaling messages on the uplink DPCCH to the RAN 120, 472. For example, starting in Release 6, a post-verification (a.k.a., Fast L1 Sync) feature was introduced to facilitate ATs beginning uplink DPCCH transmissions, 472, for uplink L1 synchronization as soon as the Cell Update Confirm message is decoded. Also, as discussed above, the L1 synchronization procedure on the downlink may alternatively be performed over the F-DPCH to improve OVSF utilization if the AT engaged in the L1 synchronization procedure when the HS-DSCH is configured and the DCH is not configured at the AT.

At some point after the Cell Update Confirm message is received in 466, AT 2 transitions to CELL_DCH state, 475, and AT 2 transmits a Cell Update Confirm response message (e.g., a Radio Bearer Reconfiguration Complete message, a Transport Channel Reconfiguration Complete message and/or a Physical Channel Reconfiguration Complete message, based on whether the Radio Bearer, Transport Channel or Physical Channel is the higher layer to be reconfigured in the Cell Update Confirm message of 466) to the RAN 120 on the uplink E-DCH, 478.

At some point after receiving the Cell Update Confirm response message in 478, the RAN 120 sends the announce message to AT 2 on the HS-DSCH, 484. In an example, in 3GPP Release 6, after the L1 synchronization process, AT 2 sends a channel quality indicator (CQI) that reports measured signal quality measured at AT 2 for a downlink high-speed dedicated shared channel (HS-DSCH) on an uplink high-speed DPCCH (HS-DPCCH), and the announce message may be sent only after the HS-DPCCH CQI and/or Cell Update Confirm response message is received. In an alternative example, in 3GPP Release 99, the announce message can be sent on a downlink DCH to AT 2 after the transport configuration complete message is received at 478 (e.g., without a HS-DPCCH CQI).

After receiving the announce message, AT 2 can auto-accept the announce message (e.g., if the announced call is an emergency call), can auto-reject the announce message (e.g., if AT 2 is already engaged in another session) or can allow a user of AT 2 to determine whether to accept the announced call. The delay during which AT 2 processes the announce message to determine whether to accept the call corresponds to block 487 in FIG. 4B. For convenience of explanation, assume that AT 2 determines to accept the announced call, and as such AT 2 sends a call accept message on the uplink E-DCH to the RAN 120, 490, which then forwards the call accept message to the application server 170, 492. Upon receiving a call accept message from AT 2, the application server 170 sends a call status message to the RAN 120, 494, and the RAN 120 transmits the call status message to AT 1 on the HS-DSCH, 496. Upon receiving the call status message, AT 1 plays a floor-grant tone that indicates to a user of AT 1 that the communication session can begin, 498.

As will be appreciated by one of ordinary skill in the art, the call announcement message in FIGS. 4A and 4B is sent at 484 only after (i) the L1 synchronization procedure completes at 472 and (ii) the cell update confirm response message arrives at the RAN 120 from AT 2. Also, the process of FIGS. 4A and 4B may undergo a delay between receipt of the Cell Update Confirm message (or reconfiguration message) at AT 2 in 466 and the receipt of the reconfiguration complete message at the RAN 120 in 478 (e.g., with fast L1 sync). Also, an additional delay may occur between transmission of the announce message in 484 and the receipt of the call accept message at the RAN 120 from AT 2 in 490. Embodiments of the invention are directed to more quickly providing the announce message to AT 2. A brief discussion of various 3GPP standards will now be provided to aid in the understanding of the embodiments of the invention.

Section 4.3.2.3 of 3GPP Technical Specification (TS) 25.214 (e.g., of Release 5 through Release 8) describes a given Synchronization procedure ("Synchronization Procedure A"). In Section 4.3.2.3(b), the 3GPP TS 25.214 states that "UTRAN shall start the transmission of the downlink DPCCH and may start the transmission of DPDCH if any data is to be transmitted", and in Section 4.3.2.3(d), the 3GPP TS 25.214 states that "[t]he transmission of the uplink DPCCH power control preamble shall start Npcp radio frames prior to the start of uplink DPDCH transmission, where $N_{pcp}$ is a higher layer parameter set by UTRAN".

From the above-noted sections of 3GPP TS 25.214, it will be appreciated that 3GPP TS 25.214 permits (i.e., does not prevent) the UTRAN (e.g., the RAN 120) to transmit downlink data over the dedicated physical dedicated channel (DPDCH) while the downlink L1 synchronization (i.e., block 469 in FIG. 4B) is in progress. Thus, as will be discussed in more detail below with respect to FIGS. 6B and 6C, this means the announce message can be sent on the downlink DCH over DPDCH, in accordance with 3GPP Release 99, relatively soon after the downlink L1 synchronization process begins, and need not wait for the downlink L1 synchronization process to complete as in FIGS. 4A and 4B.

Also, from the above-noted sections if 3GPP TS 25.214, it will be further appreciated that 3GPP TS 25.214 permits (i.e., does not prevent) the UTRAN (e.g., the RAN 120) to transmit downlink data over a high-speed dedicated shared channel (HS-DSCH) while the downlink L1 synchronization (i.e., block 469 in FIG. 4B) is in progress. It will be further appreciated that 3GPP TS 25.214 permits (i.e., does not prevent) the ATs undergoing synchronization (e.g., AT 2) to transmit on a uplink high-speed DPCCH (HS-DPCCH) (e.g., to send ACKs, NAKs and/or channel quality indicators (CQIs) based on downlink HS-DSCH transmissions) while the DPCCH or F-DPCH synchronization procedure for uplink L1 is still processing (i.e., block 472 in FIG. 4B). Thus, as will be discussed in more detail below with respect to FIG. 6A, this means the announce message can be sent on the downlink HS-DSCH after AT 2 sends a HS-DPCCH CQI, in accordance with 3GPP Release 99, relatively soon after the downlink L1 synchronization process begins, and need not wait for the downlink L1 synchronization process to complete as in FIGS. 4A and 4B. Alternatively, as discussed below in more detail with respect to FIG. 5B, even if the L1 synchronization process completes, the serving Node B can transmit the announce message before receiving a Cell Update Confirm response message (or reconfiguration complete message).

Figure 5A:
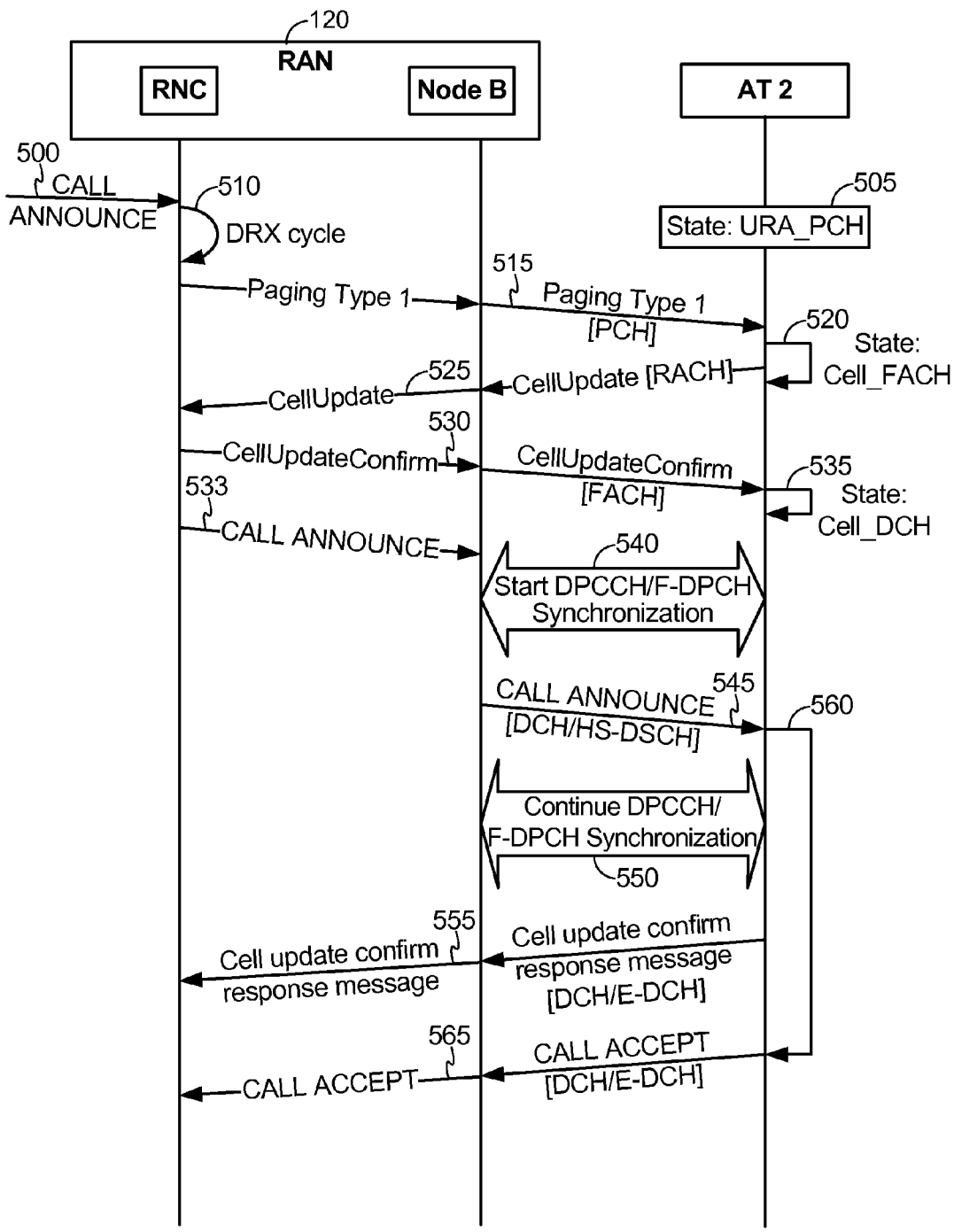
FIG. 5A illustrates a process of announcing a server-arbitrated communication session to a target access terminal in a W-CDMA system in accordance with at least one embodiment of the invention.

Accordingly, FIG. 5A illustrates a process by which the announce message for the communication session can be transmitted to AT 2 before completion of the uplink and downlink L1 synchronization procedure and/or before reception of a cell update confirm response message in accordance with an embodiment of the invention. FIG. 5A is a relatively high-level flowchart that is broad enough to cover implementations across different 3GPP releases in a W-CDMA environment, such as Release 6 and/or Release 99. Afterwards, more specific implementations of FIG. 5A are illustrated for Release 6 in FIG. 6A and for Release 99 in FIGS. 6B and 6C. However, it will be appreciated that the process of FIG. 5A is applicable to more releases than Release 6 and Release 99, and the implementation of process FIG. 5A within these particular 3GPP releases is given to facilitate understanding of the embodiments of the invention, but not to limit the invention. In its entirety, the process of FIG. 5A can be used to substitute for blocks 444 through 490 of FIGS. 4A and 4B.

Referring to FIG. 5A, after the application server 170 processes a call request message from a call originator, the application server 170 generates an announce message for announcing the communication session (e.g., PTT session) to a target AT 2 and forwards the announce message to a RNC serving target AT 2 at the RAN 120, 500. For convenience of explanation, it may be assumed that AT 2 is in URA_PCH state at this point, 505. While not shown in FIG. 5A, if AT 2 already had an active traffic channel (TCH), the RAN 120 could simply send the announce message on the already-allocated TCH. The serving RNC at the RAN 120 then waits for a next DRX cycle or paging cycle at which target AT 2 is expected to be monitoring for pages, 510.

After the serving RNC at the RAN 120 waits for the DRX cycle or paging cycle AT 2, the serving RNC forwards a type 1 page message to AT 2's serving Node B, and the serving Node B then transmits the type 1 page message on the downlink PCH to AT 2, 515. Upon receiving the page message, AT 2 transitions to CELL_FACH state, 520, and AT 2 sends a Cell Update message on the RACH that includes the U-RNTI for AT 2, which is then forwarded by the serving Node B to the serving RNC, 525. In 530, the serving RNC at the RAN 120 configures and forwards a Cell Update Confirm message (or reconfiguration message) to the serving Node B for transmission to AT 2. The Cell Update Confirm message assigns dedicated physical channels for DCH, and may also assign dedicated physical channels for the E-DCH with an E-RNTI if the E-DCH is to be used by AT 2 for uplink data transmission. Blocks 520 through 530 of FIG. 5A correspond to blocks 444 through 466 of FIGS. 4A and 4B, respectively. In 533, the serving RNC also forwards the announce message to the serving Node B for transmission to AT 2.

Upon receiving and processing the Cell Update Confirm message in 530, AT 2 immediately transitions to CELL_DCH state, 535. Accordingly, as soon as AT 2 processes the Cell Update Confirm message (e.g., extracts information necessary for DCH decoding, such as a channelization code, etc.), AT 2 can begin to decode or monitor the downlink DPDCH in Release 99. Likewise, in Release 6, as soon as AT 2 processes the Cell Update Confirm message, AT 2 begins to decode or monitor the downlink HS-DSCH and also has the option of transmitting uplink data on the HS-DPCCH (e.g., HS-DPCCH CQIs, ACKs, NAKs, etc.). It will be appreciated that this monitoring and/or transmitting is performed concurrently with the L1 synchronization process over the DPCCH.

In 540, after the Cell Update Confirm message (or reconfiguration message) is processed, the serving Node B of the RAN 120 and AT 2 begin the L1 synchronization procedure on the DPCCH and/or F-DPCH (e.g., as in 469 and 472 of FIG. 4B). For example, starting in Release 6, a post-verification (a.k.a., Fast L1 Sync) feature was introduced to facilitate ATs beginning uplink DPCCH transmissions for L1 synchronization as soon as the Cell Update Confirm message is decoded. Accordingly, during the L1 synchronization procedure of 540, the RAN 120 sends signaling messages on the downlink DPCCH to AT 2, and AT 2 sends signaling messages on the uplink DPCCH to the RAN 120. Also, as discussed above, the L1 synchronization procedure may alternatively be performed over the F-DPCH to improve OVSF utilization if the AT engaged in the L1 synchronization procedure when the HS-DSCH is configured and the DCH is not configured at the AT.

In FIG. 5A, before the L1 synchronization process completes, the serving Node B at the RAN 120 transmits the announce message to at least AT 2 over either the DCH (e.g., in accordance with Release 99) or over the HS-DSCH (e.g., in accordance with Release 6, after a HS-DPCCH CQI is received from AT 2), 545. In an example, in Release 6, the announce message transmission of 545 can be triggered by the HS-DPCCH CQI. In a further example, also in Release 6, AT 2 can be configured to send the HS-DPCCH CQI as early as possible (e.g., as soon as information for computing the CQI is available). This is described in more detail below with respect to FIG. 6A.

Figure 5B:
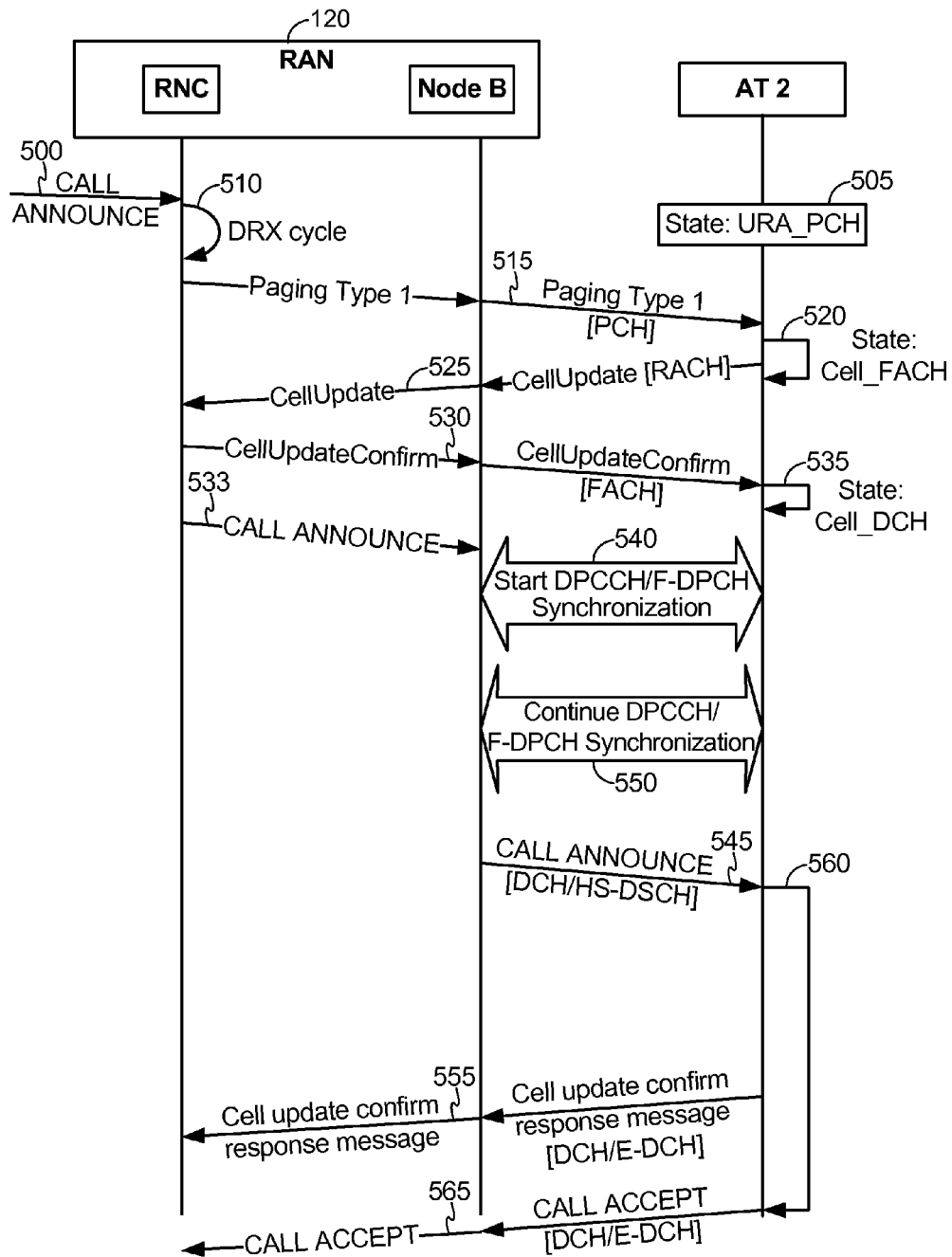
FIG. 5B illustrates an alternative process of announcing a server-arbitrated communication session to a target access terminal in a W-CDMA system in accordance with at least one embodiment of the invention.

Alternatively, as shown in FIG. 5B, the transmission of 545 can occur after the L1 synchronization process completes but before AT 2 sends a Cell Update Confirm response message to the serving Node B. In other words, in contrast to FIG. 5A, in FIG. 5B, the transmission of 545 can be moved to after block 550 but before receipt of the cell update confirm response message at block 555. A further description of FIG. 5B has been omitted because FIG. 5B substantially corresponds to FIG. 5A except for the order of blocks 545 and 550. Also, embodiments described below are generally directed to the FIG. 5A implementation instead of the FIG. 5B implementation, whereby the call announcement necessarily occurs prior to L1 synchronization completion. However, it will be readily appreciated how each of the embodiments can be modified such that the call announcement message transmission can occur subsequent to the L1 synchronization complete but prior to reception of the cell update confirm message (or reconfiguration complete message) at the RAN 120.

Turning back to FIG. 5A, the L1 synchronization process continues until the DPCCH and/or F-DPCH at the serving Node B of the RAN 120 and AT 2 is synchronized, 550. After the L1 synchronization procedure is complete, AT 2 transmits a Cell Update Confirm response message (e.g., a Radio Bearer Reconfiguration Complete message, a Transport Channel Reconfiguration Complete message and/or a Physical Channel Reconfiguration Complete message, based on whether the Radio Bearer, Transport Channel or Physical Channel is the higher layer to be reconfigured in the Cell Update Confirm message of 530) on the DCH or E-DCH to the serving Node B at the RAN 120, which forwards the Cell Update Confirm response message to the serving RNC, 555.

After receiving the announce message in 545, AT 2 can auto-accept the announce message (e.g., if the announced call is an emergency call), can auto-reject the announce message (e.g., if AT 2 is already engaged in another session) or can allow a user of AT 2 to determine whether to accept the announced call. The delay during which AT 2 processes the announce message to determine whether to accept the call corresponds to block 560 in FIG. 5A. For convenience of explanation, assume that AT 2 determines to accept the announced call, and as such AT 2 sends a call accept message on the uplink link DCH or E-DCH to the serving Node B at the RAN 120, which forwards the call accept message to the serving RNC, 565.

As will be appreciated by one of ordinary skill in the art, while the process of FIG. 5A undergoes a delay between receipt of the Cell Update Confirm message at AT 2 in 530 and the receipt of the Cell Update Confirm response message at the RAN 120 in 555 (e.g., with fast L1 sync), delays associated with the processing of the announce message can be reduced because these delays are dealt with concurrently (i.e., in parallel) with the L1 synchronization process.

In particular, in most conventional implementations such as FIGS. 4A and 4B, an initial downlink transmission of data (e.g., such as an announce message) is triggered by reception of the Cell Update Confirm response message at the serving Node B and/or serving RNC. In the embodiment of FIG. 5A, downlink data transmissions are not restricted or delayed until after the Cell Update Confirm response message is transmitted by the target AT, but rather can be transmitted before completion of the L1 synchronization procedure. Accordingly, it will be appreciated that delay savings in FIG. 5A can be found with respect to one or more of (i) a backhaul delay of the Cell Update Confirm response message (e.g., Transport Channel Reconfiguration Complete (TCRC) message) between the serving Node B and serving RNC over the Iub, (ii) a processing of the Cell Update Confirm response message by the serving RNC, (iii) a scheduling delay of the transmission of the announce message at the serving Node B and (iv) the processing delay at the target AT for the announce message received at 545.

Figure 6A:
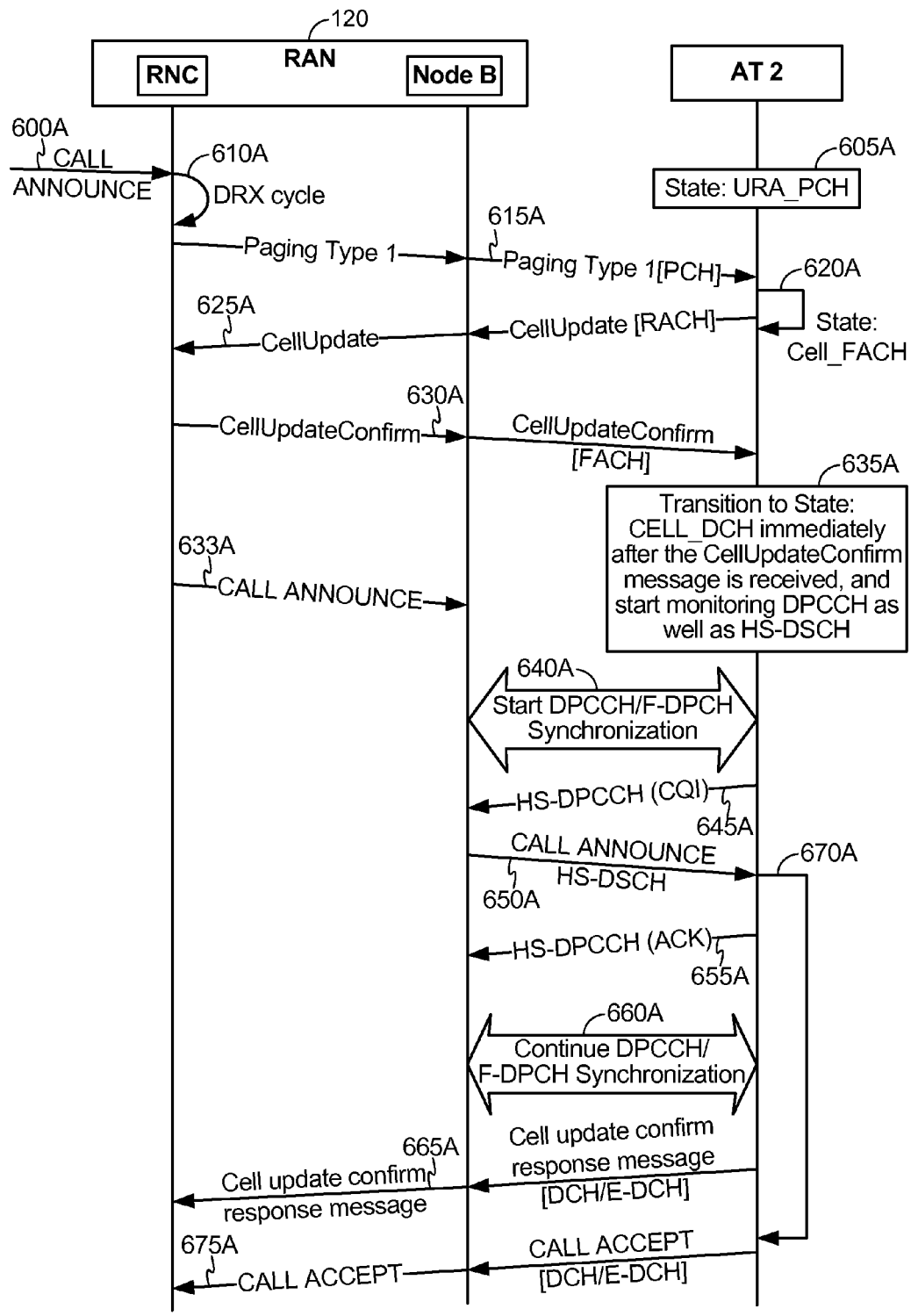
FIG. 6A illustrates the process of FIG. 5A implemented in accordance with 3GPP Release 6 in accordance with at least one embodiment of the invention.

FIG. 6A illustrates the process of FIG. 5A implemented in accordance with 3GPP Release 6 in an embodiment of the invention. Referring to FIG. 6A, blocks 600A through 633A correspond to 500 through 533 of FIG. 5A, respectively, and as such will not be discussed further for the sake of brevity.

Upon receiving and processing the Cell Update Confirm message in 630A (e.g., after extracting information necessary for HS-DSCH decoding, such as a channelization code, etc.), AT 2 immediately transitions to CELL_DCH state, 635A. Thus, AT 2 begins to decode or monitor the downlink HS-DSCH and also has the option of transmitting uplink data on the HS-DPCCH (e.g., HS-DPCCH CQIs, ACKs, NAKs, etc.). It will be appreciated that this monitoring and/or transmitting is performed concurrently with the L1 synchronization process (e.g., over the DPCCH and/or F-DPCH).

In 640A, after the Cell Update Confirm message is processed, the serving Node B of the RAN 120 and AT 2 begin the synchronization procedure on the DPCCH and/or F-DPCH (e.g., as in 540 of FIG. 5A). For example, starting in Release 6, a post-verification (a.k.a., Fast L1 Sync) feature was introduced to facilitate ATs beginning uplink DPCCH transmissions for L1 synchronization as soon as the Cell Update Confirm message is decoded. Accordingly, during the L1 synchronization procedure of 640A, the serving Node B of the RAN 120 sends signaling messages on the downlink DPCCH to AT 2, and AT 2 sends signaling messages on the uplink DPCCH to the serving Node B of the RAN 120. Also, as discussed above, the L1 synchronization procedure may alternatively be performed over the F-DPCH to improve OVSF utilization if the AT engaged in the L1 synchronization procedure when the HS-DSCH is configured and the DCH is not configured at the AT.

Before the L1 synchronization completes, assume that AT 2 has monitored a sufficient number of messages on the HS-DSCH such that AT 2 can derive a CQI that indicates a measured level of channel quality of the HS-DSCH messages received at AT 2. Accordingly, AT 2 sends a CQI on the HS-DPCCH to the serving Node B of the RAN 120 to report the measured channel quality, 645A. The serving Node B at the RAN 120 can then use the reported CQI to determine a transmission power level and/or other transmission criteria by which to send the announce message to AT 2 on the HS-DSCH. After evaluating the HS-DPCCH CQI, the serving Node B of the RAN 120 transmits the call announce message on the downlink HS-DSCH to AT 2, 650A. AT 2 responds to the downlink data on HS-DSCH by sending an HARQ ACK on the HS-DPCCH, 655A.

Next, the L1 synchronization process continues until the DPCCH and/or F-DPCH at the serving Node B of the RAN 120 and AT 2 is synchronized, 660A. After the L1 synchronization is complete, AT 2 transmits a Cell Update Confirm response message (e.g., a Radio Bearer Reconfiguration Complete message, a Transport Channel Reconfiguration Complete message and/or a Physical Channel Reconfiguration Complete message, based on whether the Radio Bearer, Transport Channel or Physical Channel is the higher layer to be reconfigured in the Cell Update Confirm message of 630A) on the uplink DCH or E-DCH to the serving Node B at the RAN 120, which forwards the Cell Update Confirm response message to the serving RNC, 665A.

After receiving the announce message in 650A, AT 2 can auto-accept the announce message (e.g., if the announced call is an emergency call), can auto-reject the announce message (e.g., if AT 2 is already engaged in another session) or can allow a user of AT 2 to determine whether to accept the announced call. The delay during which AT 2 processes the announce message to determine whether to accept the call corresponds to block 670A in FIG. 6A. For convenience of explanation, assume that each of AT 2 determines to accept the announced call, and as such AT 2 sends a call accept message on the uplink DCH or E-DCH to the serving Node B at the RAN 120, which forwards the call accept message to the serving RNC, 675A.

Figure 6B:
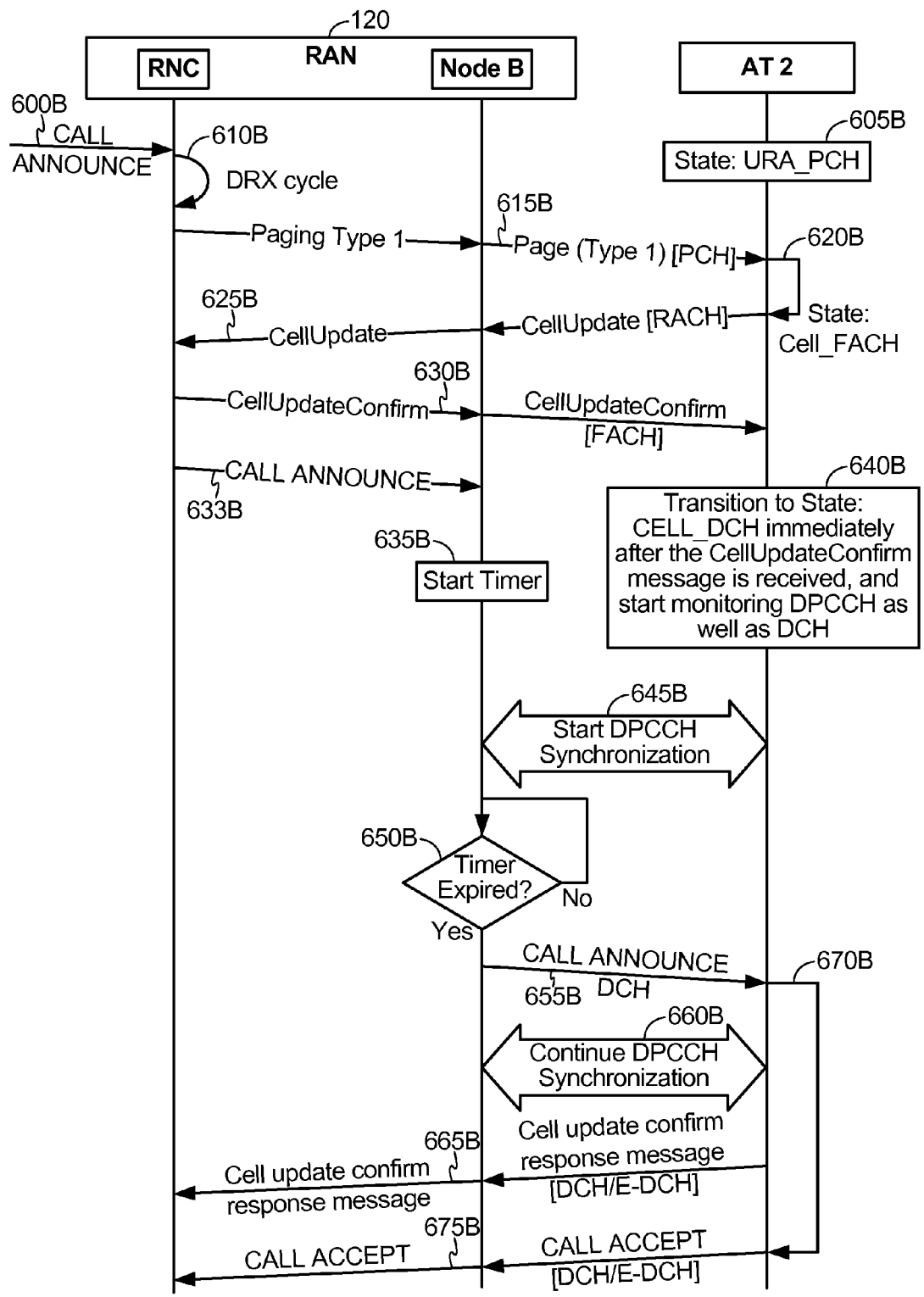
FIG. 6B illustrates the process of FIG. 5A implemented in accordance with 3GPP Release 99 in accordance with at least one embodiment of the invention.

FIG. 6B illustrates the process of FIG. 5A implemented in accordance with 3GPP Release 99 in an embodiment of the invention. Referring to FIG. 6B, blocks 600B through 633B correspond to 500 through 533 of FIG. 5A and/or 600A through 633A of FIG. 6A, respectively, and as such will not be discussed further for the sake of brevity.

In 635B, after receiving and processing the Cell Update message from AT 2 in 625B, in addition to sending the Cell Update Confirm message over the FACH in 630B, the serving Node B of the RAN 120 also starts a timer for AT 2, 635B. In an example, the expiration period of the timer may correspond to a delay that permits AT 2 time to properly decode the Cell Update Confirm message from 630B and to tune to one or more channels indicated by the Cell Update Confirm message. In other words, the decoding of the Cell Update Confirm message of 630B at AT 2 is not instantaneous, so the serving Node B of the RAN 120 permits each of AT 2 a given amount of time (e.g., corresponding to the timer period or expiration period of the timer of 635B) to decode the Cell Update Confirm message before transmitting the announce message received from the serving Node B at 655B.

Upon receiving and processing the Cell Update Confirm message in 630B (e.g., after extracting information necessary for dedicated channel (DCH) decoding, such as a channelization code, etc.), AT 2 immediately transitions to CELL_DCH state, 640B. Thus, AT 2 begins to decode or monitor their respective downlink DCH. It will be appreciated that this monitoring of the DCHs of AT 2 is performed concurrently with the L1 synchronization process over the DPCCH.

In 645B, after the Cell Update Confirm message is processed, the serving Node B of the RAN 120 and AT 2 begin the synchronization procedure on the DPCCH—(e.g., as in 540 of FIG. 5A and/or 640A of FIG. 6A). For example, starting in Release 6, a post-verification (a.k.a., Fast L1 Sync) feature was introduced to facilitate ATs beginning uplink DPCCH transmissions for L1 synchronization as soon as the Cell Update Confirm message is decoded. Accordingly, during the L1 synchronization procedure of 645B, the serving Node B of the RAN 120 sends signaling messages on the downlink DPCCH to AT 2, and AT 2 sends signaling messages on the uplink DPCCH to the RAN 120.

During the L1 synchronization process, the serving Node B of the RAN 120 periodically checks whether the timer started in 635B has expired, 650B. If the timer has not expired, the serving Node B of the RAN 120 refrains from sending the announce message to AT 2. Otherwise, if the serving Node B of the RAN 120 determines that the timer has expired in 650B, the serving Node B of the RAN 120 sends the call announce message on the downlink DCH to AT 2, 655B.

Next, the L1 synchronization process continues until the DPCCH at the serving Node B of the RAN 120 and AT 2 is synchronized, 660B. After the L1 synchronization is complete, AT 2 transmits a Cell Update Confirm response message (e.g., a Radio Bearer Reconfiguration Complete message, a Transport Channel Reconfiguration Complete message and/or a Physical Channel Reconfiguration Complete message, based on whether the Radio Bearer, Transport Channel or Physical Channel is the higher layer to be reconfigured in the Cell Update Confirm message of 630B) on the DCH or E-DCH to the serving Node B at the RAN 120, which forwards the Cell Update Confirm response message to the serving RNC, 665B. Also, it will be appreciated that if the serving Node B of the RAN 120 receives the Cell Update Confirm response message in 665B before expiration of the timer from 635B, the serving Node B of the RAN 120 sends the announce message despite the timer not yet having expired, because the timer in 635B is to grant AT 2 time to decode the Cell Update Confirm message, and the Cell Update Confirm response message is an actual indication that the Cell Update Confirm message has been decoded (e.g., although the delay before AT 2 can send the Cell Update Confirm response message makes it unlikely for this scenario to occur, at least if the timer is set relatively aggressively).

After receiving the announce message in 655B, AT 2 can auto-accept the announce message (e.g., if the announced call is an emergency call), can auto-reject the announce message (e.g., if AT 2 is already engaged in another session) or can allow a user of AT 2 to determine whether to accept the announced call. The delay during which AT 2 processes the announce message to determine whether to accept the call corresponds to block 670B in FIG. 6B. For convenience of explanation, assume that each of AT 2 determines to accept the announced call, and as such AT 2 sends a call accept message on the uplink DCH or E-DCH to the serving Node B of the RAN 120, which forwards the call accept message to the serving RNC, 675B.

While FIG. 6B illustrates an embodiment by which transmission of an announce message is delayed to improve the chances that AT 2 will properly receive the announce message, another embodiment can improve the decoding success rate of the announce message by sending multiple repetitions of the announce message, as will be described below with respect to FIG. 6C.

Figure 6C:
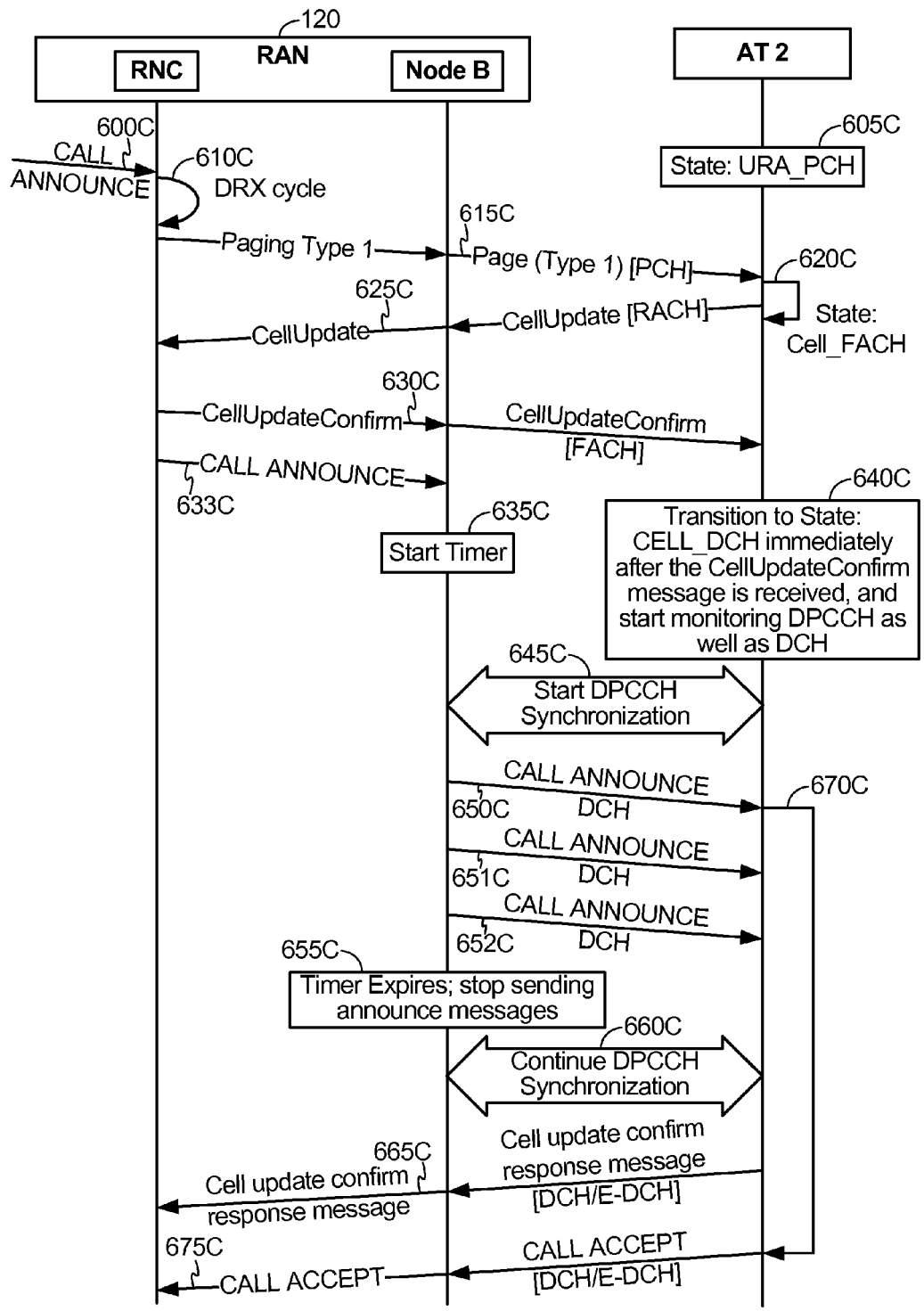
FIG. 6C illustrates the process of FIG. 5A implemented in accordance with 3GPP Release 99 in accordance with another embodiment of the invention.

FIG. 6C illustrates the process of FIG. 5A implemented in accordance with 3GPP Release 99 in another embodiment of the invention. Referring to FIG. 6C, blocks 603C through 630C correspond to 500 through 533 of FIG. 5A, 600A through 633A of FIG. 6A and/or 600B through 633B of FIG. 6B, respectively, and as such will not be discussed further for the sake of brevity.

In 635C, after receiving and processing the Cell Update message from AT 2 in 625C, in addition to sending the Cell Update Confirm message over the FACH in 630C, the serving Node B of the RAN 120 also starts a timer for AT 2, 635C. In an example, the expiration period of the timer of 635C may correspond to an announce repetition window, and can be established such that AT 2 is expected to have the capability to decode an announce message at some point within the announce repetition window. Thus, unlike the timer from 635B of FIG. 6B, the timer of 635C in FIG. 6C establishes a point after which no further announce messages are sent, and not a delay before an initial announce message is sent. In an embodiment, the start of the timer in 635C can be delayed by a given amount of time (e.g., an expected propagation time of the Cell Update Confirm message of 630C plus a minimal expected decoding processing time), which can, in an example, be less than the expiration period of the timer from 635B of FIG. 6B.

Upon receiving and processing the Cell Update Confirm message in 630C (e.g., after extracting information necessary for dedicated channel (DCH) decoding, such as a channelization code, etc.), AT 2 immediately transitions to CELL_DCH state, 640C. Thus, AT 2 begins to decode or monitor its downlink DCH. It will be appreciated that this monitoring of the DCH is performed concurrently with the L1 synchronization process over the DPCCH. In 645C, after the Cell Update Confirm message is processed, the serving Node B RAN 120 and AT 2 begin the L1 synchronization procedure on the DPCCH (e.g., as in 540 of FIG. 5A and/or 640A of FIG. 6A and/or 645B of FIG. 6B). For example, starting in Release 6, a post-verification (a.k.a., Fast L1 Sync) feature was introduced to facilitate ATs beginning uplink DPCCH transmissions for L1 synchronization as soon as the Cell Update Confirm message is decoded. Accordingly, during the L1 synchronization procedure of 645C, the serving Node B of the RAN 120 sends signaling messages on the downlink DPCCH to AT 2, and AT 2 sends signaling messages on the uplink DPCCH to the serving Node B of the RAN 120.

During the L1 synchronization process, the serving Node B of the RAN 120 periodically sends the call announce message on the downlink DCH to AT 2 at a given interval, 650C. For example, the intervals between announce message transmissions at 650C may correspond to a FACH Transmission Time Interval (TTI), which is the time unit for physical layer transmissions of MAC packets on the FACH. While the L1 synchronization process of 645C continues and the periodic announce messages are sent in 650C, the serving Node B of the RAN 120 tracks the timer started in 635C and determine whether the timer has expired. If the timer has not expired, the L1 synchronization process on the uplink and downlink of the DPCCH continues and the serving Node B of the RAN 120 continues to send periodic announce messages, 650C, 651C, and 652C. When the serving Node B of the RAN 120 determines that the timer has expired in 655C, the L1 DPCCH synchronization process continues and the serving Node B of the RAN 120 stops sending periodic announce messages. While not shown in FIG. 6C, when AT 2 decodes a first announce message of the multiple announce messages, AT 2 will ignore further announce messages for the same session.

Next, the L1 synchronization process continues until the DPCCH at the serving Node B of the RAN 120 and AT 2 is synchronized, 660C. After the L1 synchronization is complete, AT 2 transmits a Cell Update Confirm response message (e.g., a Radio Bearer Reconfiguration Complete message, a Transport Channel Reconfiguration Complete message and/or a Physical Channel Reconfiguration Complete message, based on whether the Radio Bearer, Transport Channel or Physical Channel is the higher layer to be reconfigured in the Cell Update Confirm message of 630B) on the uplink DCH or E-DCH to the serving Node B at the RAN 120, which forwards the Cell Update Confirm response message to the serving RNC, 665C.

After receiving the announce message(s), AT 2 can auto-accept the announce message (e.g., if the announced call is an emergency call), can auto-reject the announce message (e.g., if AT 2 is already engaged in another session) or can allow a user of AT 2 to determine whether to accept the announced call. The delay during which AT 2 processes the announce message to determine whether to accept the call corresponds to block 670C in FIG. 6C. For convenience of explanation, assume that each of AT 2 determines to accept the announced call, and as such AT 2 sends a call accept message on the uplink DCH or E-DCH to the serving Node B of the RAN 120, which forwards the call accept message to the serving RNC, 675C.

While references in the above-described embodiments of the invention have generally used the terms 'call' and 'session' interchangeably, it will be appreciated that any call and/or session is intended to be interpreted as inclusive of actual calls between different parties, or alternatively to data transport sessions that technically may not be considered as 'calls'. Also, while above-embodiments have generally described with respect to PTT sessions, other embodiments can be directed to any type of communication session, such as a push-to-transfer (PTX) session, an emergency VoIP call, etc.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of receiving an announcement for a communication session at an access terminal within a wireless communications system operating in accordance with a given wireless communications protocol, comprising:
   receiving a message from an access network that initiates a physical-layer synchronization procedure for at least one channel between the access network and the access terminal, the physical-layer synchronization procedure associated with a transition of the access terminal to a dedicated channel state; and
   monitoring, in response to the received message, a downlink channel for receipt of a call announcement message before the physical-layer synchronization procedure is complete.

2. The method of claim 1, further comprising:
   measuring a channel quality of the downlink channel;
   transmitting a channel quality report indicating the measured channel quality to the access network on an uplink channel during the physical-layer synchronization procedure; and
   receiving the call announcement message on the downlink channel in response to the channel quality report.

3. The method of claim 2, wherein the transmitting occurs as soon as the measuring measures a threshold number of signals of the downlink channel without waiting for the physical-layer synchronization to complete.

4. The method of claim 2, wherein the downlink channel corresponds to a high-speed downlink shared channel (HS-DSCH) and the uplink channel corresponds to a high-speed dedicated physical control channel (HS-DPCCH).

5. The method of claim 2, wherein transmission parameters associated with the call announcement message is based in part on the measured channel quality of the downlink channel.

6. The method of claim 2, wherein the given wireless communications protocol corresponds to Release 6, Release 7 or Release 8 of 3rd Generation Partnership Project (3GPP).

7. The method of claim 1, further comprising:
   receiving the call announcement message at least once before the physical-layer synchronization procedure is complete.

8. The method of claim 7, wherein the call announcement message is received a plurality of times at a given interval before the physical-layer synchronization procedure is complete.

9. The method of claim 8, wherein the given interval corresponds to one or more Forward Access Channel (FACH) Transmission Time Intervals (TTIs).

10. The method of claim 9, wherein the given interval is established based on how long the access terminal is expected to reconfigure one or more dedicated channels.

11. The method of claim 8, further comprising:
successfully decoding one of the call announcement messages; and
ignoring one or more subsequent call announcement messages received at the given interval.

12. The method of claim 7, wherein the call announcement message is received a single time before the physical-layer synchronization procedure is complete.

13. The method of claim 1, wherein the given wireless communications protocol corresponds to 3rd Generation Partnership Project (3GPP) Release 6 or Release 99.

14. The method of claim 1, further comprising:
sending a message to the access network upon completion of the physical layer synchronization procedure that indicates that the physical-layer synchronization procedure is complete; and
after sending the message, sending a call accept message that indicates whether the access terminal is accepting the call announcement message.

15. The method of claim 14, wherein the sent message and the sent call accept message are sent on an uplink dedicated channel.

16. The method of claim 14, wherein the sent message corresponds to a Radio Bearer Reconfiguration Complete message, a Transport Channel Reconfiguration Complete message and/or a Physical Channel Reconfiguration Complete message.

17. The method of claim 1, wherein the physical-layer synchronization procedure corresponds to a L1 synchronization procedure and the at least one channel includes (i) an uplink dedicated physical control channel (DPCCH), (ii) a downlink DPCCH and/or (iii) a downlink Fractional Dedicated Physical Channel (F-DPCH).

18. The method of claim 1, wherein the downlink channel corresponds to a downlink dedicated channel (DCH) or a downlink high-speed downlink shared channel (HS-DSCH).

19. The method of claim 1, further comprising:
receiving a page message from the access network;
sending a reconfiguration message to the access network in response to the page message; and
receiving a reconfiguration confirm message from the access network in response to the reconfiguration message, wherein the received message that initiates the physical-layer synchronization procedure corresponds to the reconfiguration complete message.

20. An access terminal configured to receive an announcement for a communication session within a wireless communications system operating in accordance with a given wireless communications protocol, comprising:
at least one processor and at least one transceiver configured to:
receive a message from an access network that initiates a physical-layer synchronization procedure for at least one channel between the access network and the access terminal, the physical-layer synchronization procedure associated with a transition of the access terminal to a dedicated channel state; and
monitor, in response to the received message, a downlink channel for receipt of a call announcement message before the physical-layer synchronization procedure is complete.

21. A method of receiving an announcement for a communication session at an access terminal within a wireless communications system operating in accordance with a given wireless communications protocol, comprising:
receiving a reconfiguration message from an access network that instructs the access terminal to transition to a dedicated channel state; and
monitoring, in response to the reconfiguration message, a downlink channel for receipt of a call announcement message before a reconfiguration confirm message is transmitted to the access network, the reconfiguration confirm indicating that the access terminal has successfully transitioned to the dedicated channel state.

22. The method of claim 21, further comprising:
measuring a channel quality of the downlink channel;
transmitting a channel quality report indicating the measured channel quality to the access network on an uplink channel before the reconfiguration confirm message is transmitted; and
receiving the call announcement message on the downlink channel in response to the channel quality report.

23. The method of claim 21, further comprising:
receiving the call announcement message at least once before the reconfiguration confirm message is transmitted.

24. The method of claim 21, wherein the call announcement message is received subsequent to completion of a physical-layer synchronization procedure of at least one channel between the access network and the access terminal.

25. The method of claim 24, wherein the physical-layer synchronization procedure corresponds to a L1 synchronization procedure and the at least one channel includes (i) an uplink dedicated physical control channel (DPCCH), (ii) a downlink DPCCH and/or (iii) a downlink Fractional Dedicated Physical Channel (F-DPCH).

26. The method of claim 21, wherein the reconfiguration message corresponds to a Radio Bearer Reconfiguration message, a Transport Channel Reconfiguration message and/or a Physical Channel Reconfiguration message.

27. The method of claim 21, wherein the reconfiguration confirm message corresponds to a Radio Bearer Reconfiguration Complete message, a Transport Channel Reconfiguration Complete message and/or a Physical Channel Reconfiguration Complete message.

28. An access terminal configured to receive an announcement for a communication session within a wireless communications system operating in accordance with a given wireless communications protocol, comprising:
at least one processor and at least one transceiver configured to:
receive a reconfiguration message from an access network that instructs the access terminal to transition to a dedicated channel state; and
monitor, in response to the reconfiguration message, a downlink channel for receipt of a call announcement message before a reconfiguration confirm message is transmitted to the access network, the reconfiguration confirm indicating that the access terminal has successfully transitioned to the dedicated channel state.

29. The access terminal of 20, wherein the at least one processor and the at least one transceiver are further configured to:
measure a channel quality of the downlink channel;
transmit a channel quality report indicating the measured channel quality to the access network on an uplink channel during the physical-layer synchronization procedure; and receive the call announcement message on the downlink channel in response to the channel quality report.

30. The access terminal of claim 28, wherein the at least one processor and the at least one transceiver are further configured to:
measure a channel quality of the downlink channel;
transmit a channel quality report indicating the measured channel quality to the access network on an uplink channel before the reconfiguration confirm message is transmitted; and
receive the call announcement message on the downlink channel in response to the channel quality report.

* * * * *